United States Patent
Lim

(10) Patent No.: US 11,577,717 B2
(45) Date of Patent: Feb. 14, 2023

(54) PARKING CONTROL SYSTEM FOR AUTONOMOUS VEHICLE

(71) Applicants: Hyundai Motor Company, Seoul (KR); Kia Motors Corporation, Seoul (KR)

(72) Inventor: Hye Rin Lim, Daejeon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 263 days.

(21) Appl. No.: 16/577,248

(22) Filed: Sep. 20, 2019

(65) Prior Publication Data
US 2020/0148196 A1    May 14, 2020

(30) Foreign Application Priority Data

Nov. 13, 2018    (KR) .................. 10-2018-0139247

(51) Int. Cl.
*B60W 30/06*    (2006.01)
*G05D 1/00*    (2006.01)
(Continued)

(52) U.S. Cl.
CPC .......... *B60W 30/06* (2013.01); *G05D 1/0088* (2013.01); *G05D 1/0212* (2013.01); *G08G 1/0125* (2013.01); *B60W 2554/00* (2020.02)

(58) Field of Classification Search
None
See application file for complete search history.

(56) References Cited

U.S. PATENT DOCUMENTS 9,377,315 B2    6/2016 Grover et al.
9,581,997 B1 *  2/2017 Penilla .................. B60L 53/80
(Continued)

FOREIGN PATENT DOCUMENTS

CN    102710812 A    10/2012
CN    105549454 A    5/2016
(Continued)

OTHER PUBLICATIONS

Extended European Search Report issued to European Patent Application No. 19200413.3 dated Mar. 23, 2020.
(Continued)

*Primary Examiner* — Christian Chace
*Assistant Examiner* — Scott R Jagolinzer
(74) *Attorney, Agent, or Firm* — Morgan, Lewis & Bockius LLP

(57) ABSTRACT

A parking control system for an autonomous vehicle is provided. The parking control system includes a parking control device configured to monitor a location and movement of an autonomous vehicle which enters a parking lot, based on a 3D electronic map, calculate a driving trajectory to a parking space selected by a driver of the autonomous vehicle based on sensor data collected from various sensor in the parking lot and vehicle information received from the autonomous vehicle, and provide information about the calculated driving trajectory to the autonomous vehicle. The autonomous vehicle travels to the parking space based on the driving trajectory received from the parking control device and parks in the parking space.

12 Claims, 4 Drawing Sheets

(51) Int. Cl.
*G05D 1/02* (2020.01)
*G08G 1/01* (2006.01)

(56) References Cited

U.S. PATENT DOCUMENTS

| | | | |
|---|---|---|---|
| 10,106,153 B1* | 10/2018 | Xiao | B60W 30/00 |
| 10,386,845 B1* | 8/2019 | Konrardy | G05D 1/0285 |
| 10,486,661 B2 | 11/2019 | Kurahashi et al. | |
| 10,545,505 B2* | 1/2020 | Sakai | G08G 1/16 |
| 10,775,788 B2 | 9/2020 | Kim et al. | |
| 10,793,142 B2 | 10/2020 | Nordbruch | |
| 11,422,555 B2 | 8/2022 | Kim et al. | |
| 2012/0188100 A1 | 7/2012 | Min et al. | |
| 2015/0105933 A1* | 4/2015 | Martin | G07C 5/0866 701/1 |
| 2016/0116293 A1 | 4/2016 | Grover et al. | |
| 2016/0155331 A1* | 6/2016 | Mielenz | G08G 1/14 340/932.2 |
| 2017/0124874 A1* | 5/2017 | Cai | G08G 1/04 |
| 2017/0285654 A1 | 10/2017 | Nagai et al. | |
| 2017/0313307 A1 | 11/2017 | Nordbruch | |
| 2017/0327151 A1 | 11/2017 | Nordbruch | |
| 2017/0351267 A1 | 12/2017 | Mielenz | |
| 2018/0029591 A1* | 2/2018 | Lavoie | B62D 15/0285 |
| 2018/0134262 A1 | 5/2018 | Kurahashi et al. | |
| 2018/0136655 A1* | 5/2018 | Kim | G05D 1/0011 |
| 2018/0164817 A1* | 6/2018 | Herz | G05D 1/0212 |
| 2018/0283894 A1* | 10/2018 | Alneghaimish | G08G 1/096816 |
| 2019/0243368 A1* | 8/2019 | Seki | G05D 1/0011 |
| 2019/0382002 A1* | 12/2019 | Yamazaki | B60W 30/06 |

FOREIGN PATENT DOCUMENTS

| | | |
|---|---|---|
| CN | 106080583 A | 11/2016 |
| CN | 106767879 A | 5/2017 |
| CN | 107003134 A | 8/2017 |
| CN | 107146465 A | 9/2017 |
| CN | 108068621 A | 5/2018 |
| EP | 3 225 511 A1 | 10/2017 |
| KR | 10-1575231 B1 | 12/2015 |
| KR | 101711797 B1 * | 3/2017 |
| KR | 10-2018-0053081 A | 5/2018 |

OTHER PUBLICATIONS

Office Action issued in corresponding Chinese Patent Application No. 2019109876714 dated Sep. 21, 2022, with English translation.

* cited by examiner

PARKING CONTROL SYSTEM FOR AUTONOMOUS VEHICLE

CROSS-REFERENCE TO RELATED APPLICATION

This application claims the benefit of priority to Korean Patent Application No. 10-2018-139247, filed in the Korean Intellectual Property Office on Nov. 13, 2018, the entire contents of which are incorporated herein by reference.

TECHNICAL FIELD

The present disclosure relates to a parking control system for an autonomous vehicle.

BACKGROUND

An autonomous parking system which has been recently developed finds a parking space in a parking lot by itself in the state where a driver does not ride in a vehicle and performs autonomous parking in the parking space. When the parking is completed, the autonomous parking system may perform a function of automatically turning off the vehicle.

The autonomous parking system starts the vehicle depending on a request from the driver and performs autonomous driving to get out of the parking lot and travel to a place where the driver alights from the vehicle.

For example, when the driver alights at the entrance to the parking lot and requests to park using his or her smartphone, the autonomous parking system enters the parking lot through autonomous driving and finds a parking space by itself to park in the parking space. Thereafter, when the driver requests to take the vehicle out using the smartphone at the entrance to the parking lot, the autonomous parking system may perform autonomous driving from the parking location in the parking lot to the entrance to the parking lot.

Thus, the driver may take less time to find a parking space for the vehicle and perform parking without the necessity of entering the parking lot, as the parking can be performed by the autonomous parking system.

When an autonomous vehicle enters a parking lot, because a conventional parking control system provides only a guiding route from a current location to an empty parking space, the autonomous vehicle should perform a complex computation process based on data obtained by means of various sensors to move to the empty parking space in the parking lot and may fail to move quickly and safely.

Furthermore, when the autonomous vehicle enters the parking lot, because the conventional parking control system assigns any empty parking space in which the intention of a driver is reflected, when another autonomous vehicle parks in an empty parking space assigned to one autonomous vehicle, the one autonomous vehicle fails in parking.

Furthermore, because the conventional parking control system does not monitor a location of each autonomous vehicle which enters the parking lot and an assigned parking space in real time, when the autonomous vehicle departs from a route to the assigned empty parking space due to direct driving of the driver or when there is an unexpected obstruction, it causes congestion in the parking lot and a time taken to park is increased due to the congestion.

SUMMARY

The present disclosure has been made to solve the above-mentioned problems occurring in the prior art while advantages achieved by the prior art are maintained intact.

An aspect of the present disclosure provides a parking control system for an autonomous vehicle to quickly and safely move the autonomous vehicle to an empty parking space in a parking lot by monitoring a location and movement of each autonomous vehicle which enters the parking lot based on a three-dimensional (3D) electronic map and providing a driving route (driving trajectory) as well as a guiding route to a parking space selected by the driver to each autonomous vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a parking control device for a parking control system may include: a storage storing an electronic map of a parking lot, a collector configured to collect sensor data from a sensor in the parking lot, a communicator configured to receive vehicle information from a vehicle which enters the parking lot, and a controller configured to monitor a location and movement of the vehicle based on the electronic map, calculate a driving trajectory to a parking space selected by a driver of the vehicle based on the sensor data and the vehicle information, and provide information about the calculated driving trajectory to the vehicle.

The controller may be configured to assign an ID to the autonomous vehicle, when the autonomous vehicle enters the parking lot and identify vehicle information of the autonomous vehicle based on the assigned ID.

The controller may be configured to generate a two-dimensional (2D) electronic map on which empty parking spaces of the parking lot are displayed and transmit the generated 2D electronic map to the autonomous vehicle and receive information about the parking space selected by the driver from the autonomous vehicle.

The controller may be configured to randomly assign a parking space, when there is no selection of the driver within a threshold time.

The controller may be configured to allow the driver of the autonomous vehicle to select direct parking of autonomous valet parking. The controller may be configured to calculate the driving trajectory to the parking space for the autonomous vehicle which selects the autonomous valet parking. The controller may be configured to monitor movement of the autonomous vehicle which selects the direct parking in real time and may not assign the parking space to another autonomous vehicle, when the parking is completed.

The controller may be configured to determine that autonomous valet parking is selected, when direct parking or the autonomous valet parking is not selected by the driver of the autonomous vehicle and calculate and provide the driving trajectory to the parking space.

The controller may be configured to compulsorily move the autonomous vehicle to a waiting space, when the driver of the autonomous vehicle does not alight from the autonomous vehicle. The controller may be configured to call a parking manager, when motion of the driver is not detected within a predetermined time.

According to another aspect of the present disclosure, an autonomous vehicle for a parking control system may include: a vehicle terminal configured to receive information about a driving trajectory to a parking space selected by a driver of the autonomous vehicle from a parking control device and an autonomous driving device configured to drive the autonomous vehicle to the parking space based on the driving trajectory and park the autonomous vehicle in the parking space.

The vehicle terminal may be configured to be assigned an ID from the parking control device, when the autonomous vehicle enters a parking lot and transmit vehicle information used to calculate the driving trajectory to the parking control device.

The vehicle terminal may be configured to receive a 2D electronic map on which empty parking spaces of a parking lot are displayed from the parking control device and, when the parking space is selected by the driver, transmit information about the selected parking space to the parking control device.

The vehicle terminal may be configured to allow the driver of the autonomous vehicle to select direct parking or autonomous valet parking. The autonomous driving device may be configured to move the autonomous vehicle to the parking space based on the driving trajectory and park the autonomous vehicle in the parking space, when the autonomous valet parking is selected.

The autonomous driving device may be configured to move the autonomous vehicle to the parking space using its own autonomous driving function and autonomous parking function and park the autonomous vehicle in the parking space, when the driving trajectory is not received because an error occurs in the parking control device.

According to another aspect of the present disclosure, a parking control system for an autonomous vehicle may include: a parking control device configured to monitor a location and movement of the autonomous vehicle which enters a parking lot, based on a 3D electronic map of the parking lot, calculate a driving trajectory to a parking space selected by a driver of the autonomous vehicle based on sensor data collected from various sensor in the parking lot and vehicle information received from the autonomous vehicle, and provide information about the calculated driving trajectory to the autonomous vehicle, the autonomous vehicle traveling to the parking space based on the driving trajectory received from the parking control device and parking in the parking space.

The parking control device may be configured to assign an ID to the autonomous vehicle, when the autonomous vehicle enters the parking lot, identify vehicle information of the autonomous vehicle based on the assigned ID, generate a 2D electronic map on which empty parking spaces of the parking lot are displayed and transmit the generated 2D electronic map to the autonomous vehicle, receive information about a parking space selected by the driver from the autonomous vehicle, and calculate the driving trajectory, when autonomous valet parking is selected by the driver of the autonomous vehicle.

The autonomous vehicle may be configured to be assigned the ID from the parking control device, transmit vehicle information used to calculate the driving trajectory to the parking control device, receive the 2D electronic map on which the empty parking spaces of the parking lot are displayed from the parking control device, transmit the information about the parking space selected by the driver to the parking control device, and move to the parking space based on the driving trajectory and park in the parking space.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
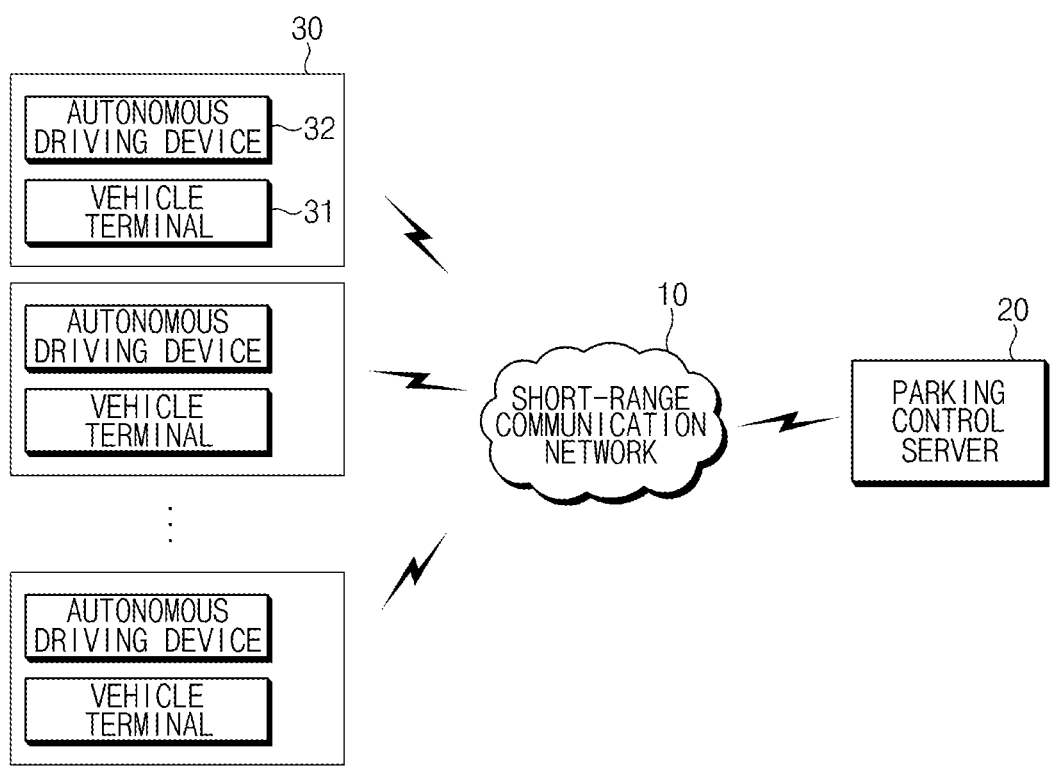
FIG. 1 is a block diagram illustrating a parking control system for an autonomous system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In an embodiment of the present disclosure, a guiding route may refer to a simple route from a current location, provided from a navigation device, to a parking space, and a driving route may refer to trajectory information substantially used for an autonomous vehicle to travel from the current location to the parking space.

FIG. 1 is a block diagram illustrating a parking control system for an autonomous system according to an embodiment of the present disclosure.

As shown in FIG. 1, the parking control system for the autonomous vehicle according to an embodiment of the present disclosure may include a short-range communication network 10, a parking control server 20, and a plurality of autonomous vehicles 30.

The short-range communication network 10 may play a role in transmitting and receiving data between the plurality of autonomous vehicles 30 and the parking control server 20 in a parking lot and may use at least one of Bluetooth™, radio frequency identification (RFID), infrared data association (IrDA), ultra wideband (UWB), ZigBee, near field communication (NFC), or wireless universal serial bus (USB) technologies.

Furthermore, the short-range communication network 10 may be wireless Internet technology and may include wireless local area network (WLAN), wireless-fidelity (Wi-Fi), Wi-Fi Direct, digital living network alliance (DLNA), wireless broadband (WiBro), world interoperability for micro-wave access (WiMAX), high speed downlink packet access (HSDPA), high speed uplink packet access (HSUPA), long term evolution (LTE), LTE-advanced (LTE-A), or the like.

The parking control server 20 may be a server, including, but not limited to, a computer or a processor, which controls each parking space as well as a location and movement of each of all the autonomous vehicles 30 which enter the parking lot, based on data from various sensors installed in the parking lot which monitor the parking lot and the vehicles and transmit the data indicative of monitored information of the parking lot and the vehicles to the parking control server 20. The parking control server 20 may have a three-dimensional (3D) electronic map of the parking lot stored in a storage medium including, but not limited to, a memory (e.g., a flash memory type memory, a hard disk type memory, a micro type memory, a card type memory (e.g., a secure digital (SD) card or an extreme digital (XD) card), random access memory (RAM), a static RAM (SRAM), a read-only memory (ROM), a programmable ROM (PROM), an electrically erasable PROM (EEPROM), magnetic RAM (MRAM), a magnetic disk, and an optical disk) of the parking control server 20. The parking control server 20 may match and monitor a current location of each of the plurality of autonomous vehicles 30 on the 3D electronic map based on data obtained by means of the various sensors installed in the parking lot and may transmit and receive various data with each of the plurality of autonomous vehicles 30 over the short-range communication network 10. The parking control server 20 may further include a non-transitory storage medium having a computer-executable program and/or algorithm stored thereon, and may perform all the functions described with reference to the parking control server 20 by executing the program and/or algorithm.

When the autonomous vehicle 30 enters the parking lot, the parking control server 20 may assign an ID to the autonomous vehicle 30 to identify the autonomous vehicle 30 in the parking lot. The parking control server 20 may receive vehicle information (e.g., a vehicle type, specifications, a vehicle number, or the like) from the autonomous vehicle 30 which is assigned the ID and may update a location of the autonomous vehicle 30 on the 3D electronic map in real time, based on position information transmitted from the autonomous vehicle 30 and/or data transmitted from the various sensors.

Moreover, the parking control server 20 may generate a driving trajectory to a parking space based on data obtained by means of the various sensors installed in the parking lot and vehicle information received from the autonomous vehicle 30. Herein, the driving trajectory may be data which is essential for the autonomous vehicle 30 to travel and may be computed through a complex computation process performed by the parking control server 20 rather than the autonomous vehicle 30.

Herein, the various sensors may include a camera, a laser scanner, a radar, an ultrasonic sensor, an infrared sensor, and the like.

For example, the laser scanner, which is a phase detection type of laser scanner, may project a laser light corresponding to a reference light onto a subject to measure a distance and may detect a reflected light reflected and returned from a surface of the subject through a condensing lens. The laser scanner may compare the detected reflected light with the reference light and may analyze a phase difference therebetween to measure a distance. Such a laser scanner may include a laser light source including a laser diode for generating a reference light projected onto a subject to measure a distance, an optical signal detection module for converting a reflected light into an electrical signal, a signal processing module for processing the electrical signal output from the optical signal detection module and detecting a phase difference between the reference light and the reflected light, a root mean square (RMS) detection module for processing an output signal of the signal processing module to detect an RMS, an addition/subtraction module for comparing the RMS output from the RMS detection module with a reference voltage and perform computation processing, a proportional-integral control module for performing proportional-integral calculation depending on calculation processing information received from the addition/subtraction module to output a control signal of a multiplication module, a modulation module, connected to the multiplication module, for modulating the reference light into a sine wave, and the multiplication module for controlling an output of the reference light emitted from the laser light source depending on a control signal of the proportional-integral control module.

For example, a radar for vehicle may include a transmit antenna, a receive antenna, a transmitter, a receiver, and a signal processor. The transmit antenna may include at least one long-range transmit antenna and at least one short-range transmit antenna. The transmitter may transmit a predetermined transmit signal via the transmit antenna. Particularly, the transmitter may generate a continuous wave transmit signal to be transmitted to an object in front of the vehicle or behind the left/right of a vehicle and may transmit the generated continuous wave transmit signal via the transmit antenna. Herein, the transmitter may include a digital/analog (D/A) converter for converting a digital signal into an analog signal. The receive antenna may be an array antenna configured with a plurality of element antennas. A receive signal received from each element antenna may be delivered to the signal processor. Such a receive antenna may include a plurality of long-range receive antennas and a plurality of short-range receive antennas. The receiver may receive a receive signal, returned after a transmit signal is reflected from a target, via the receive antenna. Particularly, when the continuous wave transmit signal is reflected and returned, the receiver may receive the returned continuous wave reflected signal. Herein, the receiver may include an A/D converter for converting the received analog signal into a digital signal. The signal processor may process the transmit signal of the transmitter and the receive signal received by the receiver. Such a signal processor may process each receive signal returned after the transmit signal transmitted by the transmitter is reflected to track a plurality of distances, and may select a target which is nearest among the plurality of tracked distances as a real target.

Furthermore, the parking control server 20 may generate an electronic map (e.g., a two-dimensional (2D) electronic map if the parking lot is a ground parking floor or a single floor parking lot, or a three-dimensional (3D) electronic map if the parking lot includes two or more levels or floors) on which empty parking spaces in the parking lot are displayed and may transmit the generated electronic map to the autonomous vehicle 30, thus receiving information about a location of a parking space selected by a driver of the autonomous vehicle 30 from the autonomous vehicle 30. In other words, the driver may identify the electronic map on which empty parking spaces in the parking lot are displayed, by means of a vehicle terminal 31 mounted on the autonomous vehicle 30. When a desired parking space is selected, e.g., by receiving an input signal in the vehicle terminal 31 from the driver, the autonomous vehicle 30 may transmit information about the parking space selected by the driver to the parking control server 20. On the other hand, when information about a location of the parking space selected by the driver is not received within a threshold time from the autonomous vehicle 30 or when the driver does not select a parking space within a preset time, the parking control server 20 may randomly assign a parking space or assign a parking space which is nearest from a current location of the autonomous vehicle 30.

Furthermore, the parking control server 20 may allow the autonomous vehicle 30 which transmits the information about the parking space selected by the driver to select direct parking or autonomous valet parking. In this case, the direct parking may mean that parking is performed by the driver. The autonomous valet parking may mean that parking is quickly performed based on a driving trajectory provided from the parking control server 20. The driver may select direct parking or autonomous valet parking via an input device in the vehicle terminal 31. Herein, the autonomous valet parking should be distinguished from autonomous parking in which the autonomous vehicle 30 parks itself without the help of the parking control server 20.

When the autonomous valet parking is selected, the parking control server 20 may calculate a driving trajectory to a parking space based on vehicle information received from the autonomous vehicle 30 and data obtained by means of the various sensors installed in the parking lot. In this case, because the driving trajectory is calculated in consideration of movement of an obstruction (e.g., a person) as well as a location and movement state of each of all the autonomous vehicles 30 in the parking lot, the autonomous vehicle 30 may quickly move to the parking space. When the autonomous valet parking is completed, the autonomous vehicle 30 may notify a portable terminal of the driver that the parking is completed by communicating with the portable terminal of the driver, which has a portable terminal number (for example, a telephone number) of the driver stored in the vehicle terminal 31 mounted on the autonomous vehicle 30. The vehicle terminal 31 may access a mobile communication network to communicate with the portable terminal of the driver.

Furthermore, when the direct parking is selected by the driver, the parking control server 20 may fail to perform the process or skip the process of calculating a driving trajectory, and may monitor movement of the autonomous vehicle 30 in real time by exchanging information with the various sensors and/or the autonomous vehicle 30. When the parking is completed, the parking control server 20 may not assign the parking space to another autonomous vehicle. In this case, when another autonomous vehicle is moving to park in the parking space, the parking control server 20 may stop moving the other autonomous vehicle, may assign a new parking space to the other autonomous vehicle, may calculate a driving trajectory from a current location of the other autonomous vehicle to the new parking space, and may transmit information about the calculated driving trajectory to the other autonomous vehicle. Furthermore, when the direct parking is completed by the driver, the autonomous vehicle 30 may transmit information indicating that the parking is completed to the parking control server 20.

Meanwhile, when the driver selects a parking space on the electronic map where empty parking spaces in the parking lot are displayed and alights from the autonomous vehicle 30, that is, after requesting the autonomous vehicle 30 to select the direct parking or the autonomous valet parking, when not receiving a message corresponding to the direct parking or a message corresponding to the autonomous valet parking from the autonomous vehicle 30, it is preferable for the parking control server 20 to calculate and provide a driving trajectory to the parking space for smooth traffic flow in the parking lot.

Furthermore, when the driver does not select a parking space on the electronic map where the empty parking spaces in the parking lot are displayed, that is, when the driver enters the parking lot and immediately alights from the autonomous vehicle 30, the parking control server 20 may assign any parking space to the autonomous vehicle 30 and may calculate a driving trajectory to the assigned parking space, thus transmitting information about the calculated driving trajectory to the autonomous vehicle 30. In this case, when the parking is completed, the autonomous vehicle 30 may transmit a message for providing a notification that the parking is completed to the portable terminal of the driver.

Furthermore, when the driver who rides in the autonomous vehicle 30 does not alight from the autonomous vehicle 30, the parking control server 20 may compulsorily move the autonomous vehicle 30 to a waiting space to prevent traffic congestion in the parking lot. In this case, when motion of the driver in the autonomous vehicle 30 is not detected within a predetermined time by the various sensors and/or by sensors installed in the autonomous vehicle 30, the parking control server 20 may determine that the health of the user becomes poor to make contact with a parking manager or an emergency medical center.

Such a parking control server 20 may enable the autonomous vehicle 30 to park in any location in the parking lot to ensure convenience of the driver.

The autonomous vehicle 30 may be a vehicle which is able to travel to a destination without driver intervention and may include an autonomous driving device 32 for performing a function of allowing the autonomous vehicle 30 to travel itself to a parking space of the parking lot and park in the parking space and a vehicle terminal 31 for playing a role as an interface between the parking control server 20 and the driver.

When entering the parking lot, such an autonomous vehicle 30 may be assigned an ID from the parking control server 20 over the short-range communication network 10 and may transmit vehicle information used to calculate a driving trajectory to the parking control server 20. In this case, the assigned ID may be recorded in a message including the vehicle information, such that the parking control server 20 may identify a source of the message.

Furthermore, the autonomous vehicle 30 may receive the electronic map where the empty spaces in the parking lot are displayed from the parking control server 20 via the vehicle terminal 31 to provide the electronic map to the driver and may transmit information (location) about a parking space selected by the driver to the parking control server 20.

Furthermore, when the autonomous valet parking is selected by the driver, the autonomous vehicle 30 may receive a driving trajectory from the parking control server 20 and may move to a parking space to park in the parking space. In this case, the autonomous vehicle 30 may operate in a narrow road driving mode and a parking mode. For reference, the narrow road driving mode may refer to a mode of avoiding a collision with an adjacent obstruction using only a proximity sensor loaded into the autonomous vehicle 30 and traveling at a low speed.

Meanwhile, when the driver selects a parking space on the electronic map where the empty parking spaces in the parking lot are displayed and alights from the autonomous vehicle 30, the autonomous vehicle 30 may immediately notify the parking control server 20 of the selected parking space and may receive a driving trajectory from the parking control server 20. In this case, when the parking is completed, the autonomous vehicle 30 may transmit a message for providing a notification that the parking is completed to the portable terminal of the driver.

Furthermore, when the autonomous vehicle 30 does not receive a driving trajectory because an error occurs in the parking control server 20, it may travel to a previously selected parking space using its own autonomous driving function and may perform autonomous parking.

Figure 2:
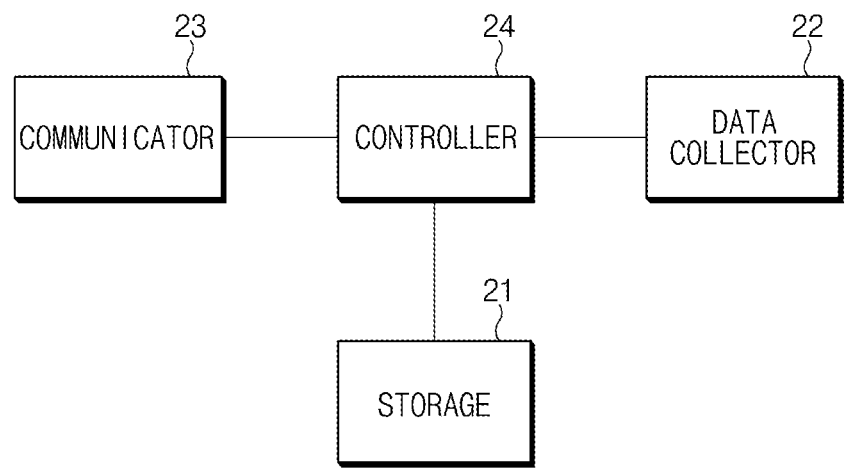
FIG. 2 is a block diagram illustrating a detailed configuration of a parking control server according to an embodiment of the present disclosure.

FIG. 2 is a block diagram illustrating a detailed configuration of a parking control server according to an embodiment of the present disclosure.

As shown in FIG. 2, a parking control server (or a parking control device) 20 according to an embodiment of the present disclosure may include a storage 21, a data collector 22, a communicator 23, and a controller 24. The respective components may be combined with each other to form one component depending on a manner which executes an embodiment of the present disclosure, and some components may be omitted according to a manner which executes an embodiment of the present disclosure.

Seeing the respective components, first of all, the storage 21 may store a 2D or 3D electronic map in a parking lot.

Such a storage 21 may include at least one type of storage medium, such as a flash memory type memory, a hard disk type memory, a micro type memory, a card type memory (e.g., a secure digital (SD) card or an extreme digital (XD) card), a random access memory (RAM), static RAM (SRAM), a read-only memory (ROM), a programmable ROM (PROM), an electrically erasable PROM (EEPROM), a magnetic PAM (MRAM), a magnetic disk, and an optical disk.

The data collector 22, which may include electronics, circuits, processor/microprocessor, and/or a non-transitory storage medium having a computer-executable program and/or algorithm stored thereon, may collect sensor data from various sensors installed in the parking lot and/or data such as position information from the autonomous vehicle 30, when the data collector 22 executes the program and/or algorithm.

The communicator 23 may be a module including, but not limited to, an antenna, which provides a communication interface with an autonomous vehicle 30 of FIG. 2 and may transmit and receive various data with the autonomous vehicle 30 and/or the various sensors installed in the parking lot. In addition, the communicator 23 may provide the various data to the data collector 22 under the control of the controller 24, such that the data collector 22 may collect the data from various sensors installed in the parking lot and from the autonomous vehicle 30.

The controller 24 may perform overall control such that the respective components normally perform their own functions. Such a controller 24 may be implemented in the form of hardware or software or in the form of a combination thereof. Preferably, the controller 24 may be implemented as, but not limited to, a microprocessor and/or a non-transitory storage medium having a computer-executable program and/or algorithm stored thereon, and may perform overall control by executing the program and/or algorithm.

When the autonomous vehicle 30 enters the parking lot, such a controller 24 may assign an ID to the autonomous vehicle 30 and may receive vehicle information (e.g., a vehicle type, specifications, a vehicle number, or the like) from the autonomous vehicle 30 which is assigned the ID, via the communicator 23.

Furthermore, the controller 24 may generate an electronic map (a 2D or 3D electronic map) where empty parking spaces in the parking lot are displayed to transmit the electronic map to the autonomous vehicle 30 and may receive information about a location of a parking space selected by a driver of the autonomous vehicle 30 from the autonomous vehicle 30. In this case, when the information about the location of the parking space selected by the driver is not received within a threshold time from the autonomous vehicle 30 or when the driver does not select a parking space within a preset time, the controller 24 may randomly assign a parking space.

Furthermore, the controller 24 may allow the autonomous vehicle 30 which transmits information about the parking space selected by the driver to select direct parking or autonomous valet parking.

Furthermore, when the autonomous valet parking is selected, the controller 24 may calculate a driving trajectory to the parking space based on the vehicle information received from the autonomous vehicle 30 and the data obtained by means of the various sensors installed in the parking lot.

Furthermore, when the direct parking is selected by the driver, the controller 24 may fail to perform the process or skip the process of calculating a driving trajectory, and may monitor movement of the autonomous vehicle 30 in real time by exchanging information with the various sensors and/or the autonomous vehicle 30. When the parking is completed, the controller 24 may not assign the parking space to another autonomous vehicle. That is, when the parking is completed, the controller 24 may assign another available parking space to the other autonomous vehicle, as the parking space assigned to the autonomous vehicle 30 has been occupied by the autonomous vehicle 30.

Meanwhile, when the driver selects a parking space on the electronic map where the empty parking spaces in the parking lot are displayed and alights from the autonomous vehicle 30, that is, after requesting to the autonomous vehicle 30 to select the direct parking or the autonomous valet parking, when not receiving a message corresponding to the direct parking or a message corresponding to the autonomous valet parking from the autonomous vehicle 30, the controller 24 may calculate and provide a driving trajectory to the parking space for smooth traffic flow in the parking lot.

Furthermore, when the driver does not select a parking space on the electronic map where the empty parking spaces in the parking lot are displayed, that is, when the driver enters the parking lot and immediately alights from the autonomous vehicle 30, the controller 24 may assign any parking space to the autonomous vehicle 30 and may calculate a driving trajectory to the assigned parking space, thus transmitting information about the calculated driving trajectory to the autonomous vehicle 30.

Furthermore, when the driver of the autonomous vehicle 30 does not alight from the autonomous vehicle 30, the controller 24 may compulsorily move the autonomous vehicle 30 to a waiting space to prevent traffic congestion in the parking lot. In this case, when motion of the driver in the autonomous vehicle 30 is not detected within a predetermined time, the controller 24 may determine that the health of the driver becomes poor to make contact with a parking manager or an emergency medical center.

Figure 3:
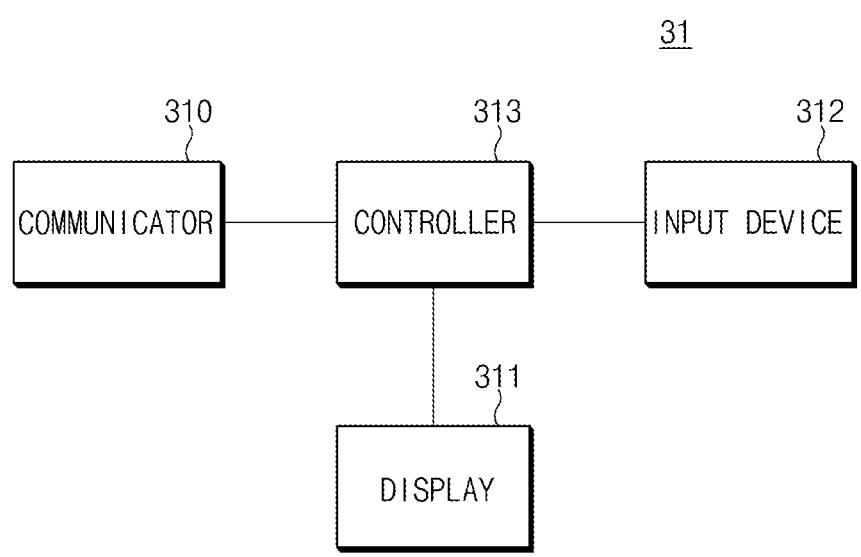
FIG. 3 is a block diagram illustrating a configuration of a vehicle terminal of an autonomous vehicle according to an embodiment of the present disclosure.

FIG. 3 is a block diagram illustrating a configuration of a vehicle terminal of an autonomous vehicle according to an embodiment of the present disclosure.

As shown in FIG. 3, a vehicle terminal 31 of an autonomous vehicle according to an embodiment of the present disclosure may include a communicator 310, a display 311, an input device 312, and a controller 313. The respective components may be combined with each other to form one component depending on a manner which executes an embodiment of the present disclosure, and some components may be omitted according to a manner which executes an embodiment of the present disclosure.

Seeing the respective components, the communicator 310 may be a module including, but not limited to, e.g., an antenna, which provides a communication interface with a parking control server 20 of FIG. 1 and may transmit and receive various data with the parking control server 20.

Such a communicator 310 may transmit vehicle information used to calculate a driving trajectory to the parking control server 20 and may receive an electronic map where empty parking spaces of a parking lot are displayed and the driving trajectory from the parking control server 20. Furthermore, the communicator 310 may further receive information about an obstruction in the parking lot from the parking control server 20.

The display 311 may display the electronic map where the empty parking spaces in the parking lot are displayed and a screen for allowing a driver to select a parking mode (e.g., direct parking or autonomous valet parking).

The input device 312 may allow the user to select a parking space and a parking mode and transmit a signal indicative of a selection by the user to the controller 313.

The controller 313 may perform overall control such that the respective components normally perform their own functions. Such a controller 313 may be implemented in the form of hardware or software or in the form of a combination thereof. Preferably, the controller 313 may be implemented as, but not limited to, a microprocessor and/or a non-transitory storage medium having a computer-executable program and/or algorithm stored, and may perform overall control by executing the program and/or algorithm.

When an autonomous vehicle 30 of FIG. 1 enters the parking lot, such a controller 313 or such an autonomous vehicle 30 may be assigned an ID from the parking control server 20 over a short-range communication network 10 of FIG. 1 and may transmit vehicle information used to calculate a driving trajectory to the parking control server 20. In this case, the controller 313 may record the assigned ID in a message including the vehicle information such that the parking control server 20 identifies a source of the message.

Furthermore, the controller 313 may receive a 2D or 3D electronic map where empty parking spaces in the parking lot are displayed from the parking control server 20 via the communicator 310 and may display the electronic map on the display 311 such that the driver sees the 2D electronic map. The controller 313 may transmit information (location) about a parking space selected by the driver to the parking control server 20 via the communicator 310.

Meanwhile, when the driver selects a parking space on the 2D electronic map where the empty parking spaces in the parking lot are displayed and alights from the autonomous vehicle 30 without selecting whether to perform autonomous valet parking, the controller 313 may immediately notify the parking control server 20 of it and may receive a driving trajectory from the parking control server 20. In this case, when the parking is completed, the controller 313 may transmit a notification message to a portable terminal of the driver.

Meanwhile, when the autonomous valet parking is selected by the driver, an autonomous driving device 32 of the autonomous vehicle according to an embodiment of the present disclosure may move the autonomous vehicle to the parking space based on the driving trajectory provided from the parking control server 20 and may park the autonomous vehicle in the parking space. In this case, the autonomous vehicle 30 may operate in a narrow road driving mode and a parking mode. For reference, the narrow road driving mode may refer to a mode of avoiding a collision with an adjacent obstruction using only a proximity sensor loaded into the autonomous vehicle 30 and traveling at a low speed.

Furthermore, when the autonomous device 32 does not receive a driving trajectory because an error occurs in the parking control server 20, the autonomous device 32 may perform autonomous driving to a previously selected parking space using its own autonomous driving function and autonomous parking function and may perform autonomous parking. The autonomous device 32 may include hardware including sensors, actuators, a microprocessor, and/or a non-transitory storage medium having a computer-executable program and/or algorithm stored thereon. The autonomous device 32 may perform autonomous driving and autonomous parking, by executing the program and/or algorithm.

Figure 4:
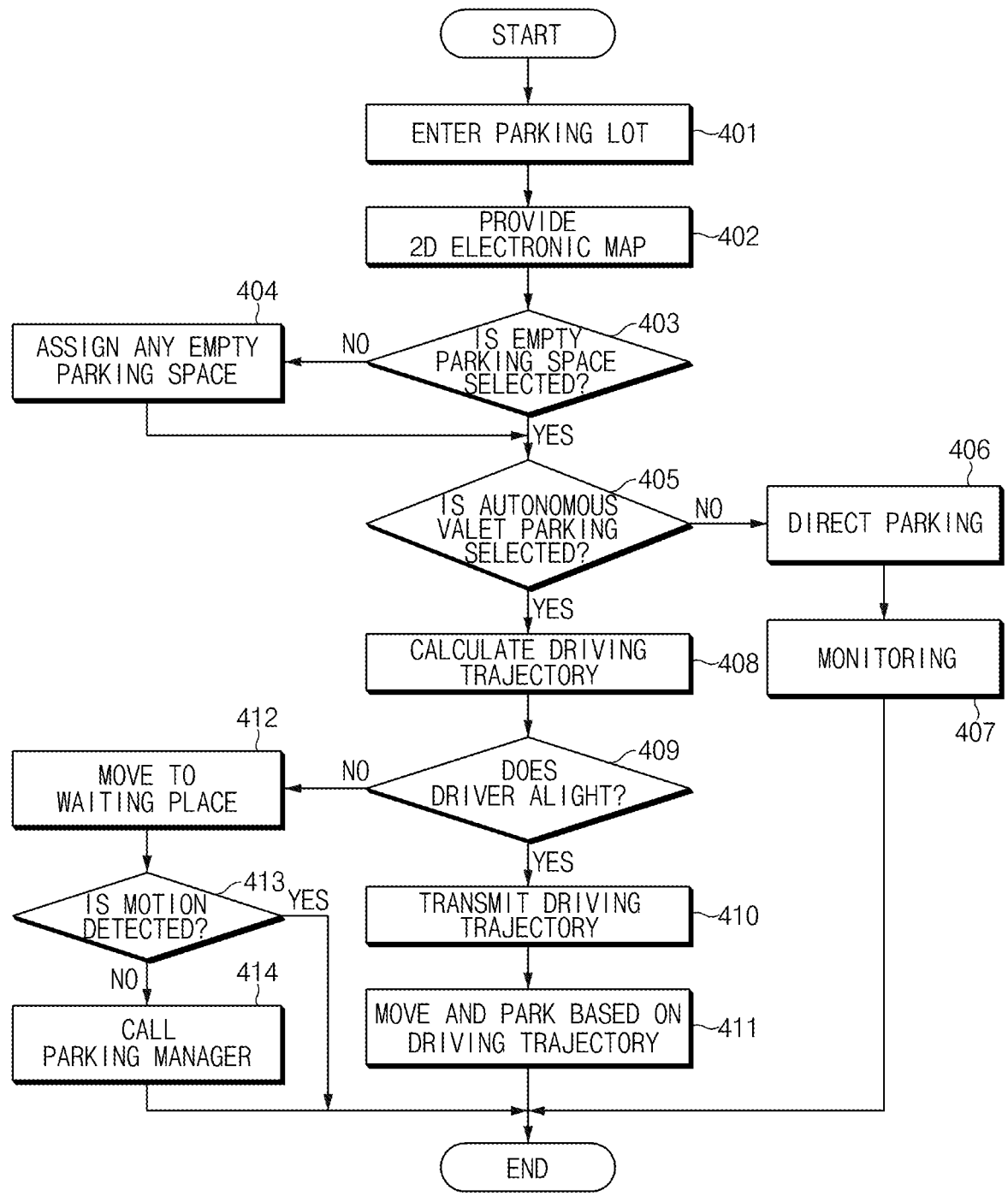
FIG. 4 is a flowchart illustrating a parking control method for an autonomous vehicle according to an embodiment of the present disclosure.

FIG. 4 is a flowchart illustrating a parking control method for an autonomous vehicle according to an embodiment of the present disclosure.

First of all, when an autonomous vehicle 30 of FIG. 1 enters a parking lot in operation 401, a parking control server 20 of FIG. 1 may transmit a 2D (or a 3D) electronic map where empty parking spaces of the parking lot are recorded to the autonomous vehicle 30 in operation 402.

In operation 403, the parking control server 20 may determine whether an empty parking space is selected by a driver of the autonomous vehicle 30.

When the parking space is not selected as a result of the determination in operation 403, the parking control server 20 may assign any parking space to the autonomous vehicle 30 in operation 404. When the parking space is selected in operation 403, the parking control server 20 may determine whether autonomous valet parking is selected by the driver in operation 405.

When the autonomous valet parking is selected as a result of the determination in operation 405, the parking control server 20 may proceed to operation 408. When the autonomous valet parking is not selected in operation 405, the parking control server 20 may determine that direct parking is performed in operation 406. In operation 407, the parking control server 20 may perform monitoring until the parking is completed.

In operation 408, the parking control server 20 may calculate a driving trajectory from a current location of the autonomous vehicle 30 to the parking space based on the vehicle information of the autonomous vehicle 30 and the sensor data obtained from various sensors in the parking lot.

In operation 409, the autonomous vehicle 30 may determine whether the driver alights. In this case, the alighting of the driver may be determined through an opening and closing of a door of the autonomous vehicle 30 or by means of a sensor installed in a seat of the autonomous vehicle 30. Information about the alighting of the driver may be transmitted to the parking control server 20.

When the alighting of the driver is detected as a result of the determination in operation 409, the parking control server 20 may transmit information about the calculated driving trajectory to the autonomous vehicle 30 in operation 410. In operation 411, the autonomous vehicle 30 may move to the parking space based on the driving trajectory and may park in the parking space.

When the alighting of the driver is not detected as a result of the determination in operation 409, in operation 412, the parking control server 20 may compulsorily move the autonomous vehicle 30 to a waiting place and may determine whether there is motion of the driver. Where there is no motion during a predetermined time in operation 413, the parking control server 20 may call a parking manager in operation 414.

An embodiment of the present disclosure may quickly and safely move an autonomous vehicle to an empty parking space in a parking lot by monitoring a location and movement of each autonomous vehicle which enters the parking lot based on a 2D or 3D electronic map and providing a driving route (driving trajectory) as well as a guiding route to a parking space selected by the driver to each autonomous vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A parking control device, comprising:
 a storage storing an electronic map of a parking lot;
 a collector configured to collect sensor data from a sensor in the parking lot;
 a communicator configured to receive vehicle information from a vehicle which enters the parking lot; and
 a controller configured to monitor a location and movement of the vehicle based on the electronic map, calculate a driving trajectory to a parking space selected by a driver of the vehicle based on the sensor data and the vehicle information, and provide information about the calculated driving trajectory to the vehicle,
 wherein the controller is configured to:
  calculate the driving trajectory in consideration of movement of an obstruction as well as a location and movement state of each of all the autonomous vehicles in the parking lot,
  when a second autonomous vehicle is parked in the parking space while a first autonomous vehicle is moving to park in the parking space, stop moving the first autonomous vehicle, assign a new parking space to the first autonomous vehicle, calculate a driving trajectory from a current location of the first autonomous vehicle to the new parking space, and transmit information about the calculated driving trajectory to the first autonomous vehicle.

2. The parking control device of claim 1, wherein the electronic map is a three-dimensional (3D) electronic map.

3. The parking control device of claim 2, wherein the controller is configured to:
 assign an ID to the vehicle, when the vehicle enters the parking lot; and
 identify the vehicle information of the vehicle based on the assigned ID.

4. The parking control device of claim 2, wherein the controller is configured to:
 generate a two-dimensional (2D) electronic map on which empty parking spaces of the parking lot are displayed and transmit the generated 2D electronic map to the vehicle; and
 receive information about the parking space selected by the driver from the vehicle.

5. The parking control device of claim 4, wherein the controller is configured to:
 randomly assign the parking space, when there is no selection of the driver within a threshold time.

6. The parking control device of claim 2, wherein the controller is configured to:
 allow the driver of the vehicle to select direct parking or autonomous valet parking.

7. The parking control device of claim 6, wherein the controller is configured to:
 calculate the driving trajectory to the parking space for the vehicle which selects the autonomous valet parking.

8. The parking control device of claim 6, wherein the controller is configured to:
 monitor movement of the vehicle which selects the direct parking in real time; and
 not assign the parking space to another autonomous vehicle, when the parking is completed.

9. The parking control device of claim 2, wherein the controller is configured to:
 determine that autonomous valet parking is selected, when direct parking or the autonomous valet parking is not selected by the driver of the vehicle; and
 calculate and provide the driving trajectory to the parking space.

10. A parking control system for an autonomous vehicle, the system comprising:
 a parking control device configured to monitor a location and movement of the autonomous vehicle which enters a parking lot, based on a 3D electronic map of the parking lot, calculate a driving trajectory to a parking space selected by a driver of the autonomous vehicle based on sensor data collected from various sensor in the parking lot and vehicle information received from the autonomous vehicle, and provide information about the calculated driving trajectory to the autonomous vehicle, the autonomous vehicle traveling to the parking space based on the driving trajectory received from the parking control device and parking in the parking space,
 wherein the parking control device is configured to:
  calculate the driving trajectory in consideration of movement of an obstruction as well as a location and movement state of each of all the autonomous vehicles in the parking lot,
  when a second autonomous vehicle is parked in the parking space while a first autonomous vehicle is moving to park in the parking space, stop moving the first autonomous vehicle, assign a new parking space to the first autonomous vehicle, calculate a driving trajectory from a current location of the first autonomous vehicle to the new parking space, and transmit information about the calculated driving trajectory to the first autonomous vehicle.

11. The parking control system of claim 10, wherein the parking control device is configured to:
- assign an ID to the autonomous vehicle, when the autonomous vehicle enters the parking lot;
- identify the vehicle information of the autonomous vehicle based on the assigned ID;
- generate a 2D electronic map on which empty parking spaces of the parking lot are displayed and transmit the generated 2D electronic map to the autonomous vehicle;
- receive information about the parking space selected by the driver from the autonomous vehicle; and
- calculate the driving trajectory, when autonomous valet parking is selected by the driver of the autonomous vehicle.

12. The parking control system of claim 11, wherein the autonomous vehicle is configured to:
- be assigned the ID from the parking control device;
- transmit the vehicle information used to calculate the driving trajectory to the parking control device;
- receive the 2D electronic map on which the empty parking spaces of the parking lot are displayed from the parking control device;
- transmit the information about the parking space selected by the driver to the parking control device; and
- move to the parking space based on the driving trajectory and park in the parking space.

\* \* \* \* \*